(12) United States Patent
Bayya et al.

(10) Patent No.: US 12,353,366 B1
(45) Date of Patent: Jul. 8, 2025

(54) SYSTEMS AND METHODS FOR GENERATING INTEGRATED DEPENDENCY DATA AND METADATA ARTIFACTS FOR STRUCTURED DATA

(71) Applicant: Capital One Services, LLC, McLean, VA (US)

(72) Inventors: Venkata Ramaswamy Bayya, McKinney, TX (US); Dimitrios Dimitropoulos, McLean, VA (US); Parul Sethi, Frisco, TX (US); Christopher Kim, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/444,548

(22) Filed: Feb. 16, 2024

(51) Int. Cl.
*G06F 16/21* (2019.01)
*G06F 11/34* (2006.01)
*G06F 16/2455* (2019.01)
*G06F 21/60* (2013.01)

(52) U.S. Cl.
CPC ........ *G06F 16/211* (2019.01); *G06F 11/3409* (2013.01); *G06F 16/24552* (2019.01); *G06F 21/604* (2013.01)

(58) Field of Classification Search
CPC ............. G06F 16/211; G06F 16/24552; G06F 11/3409; G06F 21/604
See application file for complete search history.

(56) References Cited

U.S. PATENT DOCUMENTS

2007/0067304 A1* 3/2007 Ives ...................... G06F 16/951
2022/0335049 A1* 10/2022 Hacigumus ............ G06F 9/466

* cited by examiner

*Primary Examiner* — Tony Wu
(74) *Attorney, Agent, or Firm* — Foley & Lardner LLP

(57) ABSTRACT

Systems and methods for generating deployment databases based on preloaded data from heterogeneous sources are disclosed herein. The system may receive first structured data. The system may extract first data of a first format and second data of a second format. The system may determine that the first data has a first update rate. The system may determine that the second data has a second update rate. The system may preload the first data by retrieving a first identifier and by storing a first preloaded representation of a first parent dataset for the first data. The system may receive a first request for a deployment database. The system, based on the first request, may retrieve the first preloaded representation. The system may generate the deployment database.

20 Claims, 6 Drawing Sheets

100

| Column A 102a | Column B 102b | Column C 102c |
|---|---|---|
| Value 1 | Value 2 | Value 3 |
| Value 4 | Value 5 | Value 6 |
| Value 7 | Value 8 | Value 9 |
| Value 10 | Value 11 | Value 12 |
| Value 13 | Value 14 | Value 15 |

120

| | Column A 102a | Column B 102b | Column C 102c |
|---|---|---|---|
| Parent Table(s) 122 | Parent Table 1 | Parent Table 2 | Parent Table 1; Parent Table 2 |
| Previous Update 124 | Timestamp 1 | Timestamp 2 | Timestamp 1 |
| Source File Path 126 | File Path 1 | File Path 2 | File Path 1; File Path 2 |

100

| Column A
102a | Column B
102b | Column C
102c |
|---|---|---|
| Value 1 | Value 2 | Value 3 |
| Value 4 | Value 5 | Value 6 |
| Value 7 | Value 8 | Value 9 |
| Value 10 | Value 11 | Value 12 |
| Value 13 | Value 14 | Value 15 |

| | Column A
102a | Column B
102b | Column C
102c |
|---|---|---|---|
| Parent Table(s)
122 | Parent Table 1 | Parent Table 2 | Parent Table 1;
Parent Table 2 |
| Previous Update
124 | Timestamp 1 | Timestamp 2 | Timestamp 1 |
| Source File Path
126 | File Path 1 | File Path 2 | File Path 1; File
Path 2 |

| Cache of Parent Table 1 142 | | |
|---|---|---|
| Column A 102a | Column D 144 | Column E 146 |
| Value 1 | Value 3 | Value 16 |
| Value 4 | Value 6 | Value 17 |
| Value 7 | Value 9 | Value 18 |
| Value 10 | Value 12 | Value 19 |
| Value 13 | Value 15 | Value 20 |
| Update Rate 168 | Update Rate 1 | |

| | Parent Table 1 162a | Parent Table 2 162b | Deployment Database 162c |
|---|---|---|---|
| Quality of Service Indicator 164 | QoS Value 1 | QoS Value 2 | QoS Value 3 |
| Access Control Indicator 166 | Access Control Value 1 | Access Control Value 2 | Access Control Value 3 |

SYSTEMS AND METHODS FOR GENERATING INTEGRATED DEPENDENCY DATA AND METADATA ARTIFACTS FOR STRUCTURED DATA

BACKGROUND

As computer-generated data becomes more complex and integrated into a greater variety of technical applications, secure database handling has become more important. For example, data structures enable data organization, management, and storage in a manner that may be efficient. Databases may provide organized collections of data that enable data capture and analysis, as well as administrator controls over the associated data. Small databases may be stored on a file system, while large databases may be stored on computer clusters or cloud storage. Databases may be used to support operations internal to a computing system and may interface with external users. However, despite their flexibility and ease of access, databases may also be susceptible to cybersecurity attacks, error propagation, or other associated vulnerabilities, which may limit the effectiveness of databases in storing large amounts of data effectively and safely.

SUMMARY

Methods and systems are described herein for novel uses and/or improvements to integrating data structures based on preloading associated dependencies and metadata. As one example, methods and systems are described herein for generating a database for deployment in the context of software development in an efficient manner that preserves privacy, performance, and technical constraints associated with any sources of data within the database. For example, the disclosed system enables the generation of a target database (e.g., for deployment) associated with a user account management system, where data associated with the user account management system may originate from distinct databases or sources. By doing so, the system enables improvements to productivity by automating database creation and deployment. To illustrate, a user account management system may generate a database that specifies the number of user devices associated with multiple user account types within the system, which may originate from differing databases with different security levels, access permissions, and/or update frequencies. The disclosed system enables seamless and efficient integration of this data to generate such databases while preserving any security or technical constraints associated with the source data. As such, the systems and methods disclosed herein improve the efficiency, interoperability, and flexibility of databases associated with complex data manipulation tasks.

Existing systems may struggle to integrate data of different formats or constraints for generation of a database. For example, in situations where data has different security requirements (e.g., user permissions for access to the target database), a manual review of such permissions may be required to integrate such data into a new database. As such, database deployment based on this data may be inefficient, thereby harming productivity. Moreover, this target database may be inconsistent with security requirements associated with the source data, thereby leading to possible security breaches in the event of unauthorized access to such data following deployment. Moreover, a target database derived from source data with different performance constraints or requirements may suffer from inconsistencies or unreliability in performance. For example, source data associated with a target database may have different Quality-of-Service (QOS) levels, each associated with different data transfer rates. Existing systems may not reconcile these differences in performance when providing access to the target database, thereby leading to potential security or capacity issues for the account management system. In some cases, existing systems may include data that exhibits different technical requirements (e.g., storage requirements or storage structures), thereby complicating generation of the target database in a format consistent with both types of source data.

Combining data of different formats in a modular way (e.g., without integrating such requirements between different source datasets) may enable generation of target databases that include heterogeneous information. For example, a target database may include data with different security or technical requirements and may provide separate access controls, performance attributes, or security constraints for each portion of data within the database, depending on its source. However, such modular integration of data causes difficulties in combining data or values from different sources within the target database. For example, in situations where source data has access controls, existing systems that integrate data in a piecewise manner may not allow combining such data (e.g., to generate a total sum of user accounts from two databases associated with different types of user accounts), as the source data has inconsistent security requirements. Any resulting target databases may have unclear access controls or security-related properties, requiring manual review and integration of such data. Furthermore, even in cases of agreement or consistency between data, existing systems may utilize significant amounts of processing resources to generate the deployment database in situations where the source data is sizeable. For example, existing systems may need to retrieve data from source databases prior to each calculation or manipulation event within the target database to ensure that values are up to date and consistent with the source databases.

To overcome these technical deficiencies in integrating heterogeneous source data in an efficient, accurate, and secure manner, the methods and systems disclosed herein enable the integration of dependency information and metadata information for source data in a manner that is dependent on the source data's update rate or mutability. For example, the system may determine parents (e.g., sources) of data to be integrated into a target database (e.g., a deployment database) and preload the data on which the target database depends. To illustrate, the system determines an update rate associated with how often a given source table is updated. Based on this determination, the system may preload data associated with tables that are unlikely to change (e.g., are of a final status), thereby reducing the need to retrieve large quantities of data prior to generation or deployment of the target database. Furthermore, by integrating metadata information (e.g., relating to privacy, security, performance, or technical characteristics) within a metadata structure within the target database, the system may generate efficient or uniform rules for accessing the target database while preserving any associated constraints. By doing so, the methods and systems disclosed herein provide efficient database deployment while improving the accuracy, security, and performance of the deployed data, thereby improving productivity associated with database deployment via the automation dependency data and metadata generation.

In some aspects, the system may receive, from a first database, first structured data. The system may extract, from the first structured data, first data of a first format associated with a first parent dataset and second data of a second format associated with a second parent dataset. The first data may include a first timestamp, and the second data may include a second timestamp. The system may determine that the first data has a first update rate based on the first timestamp. The system may determine that the second data has a second update rate based on the second timestamp. In response to determining that the first data has a first upload rate, the system may preload the first data by retrieving, using a first application programming interface, a first identifier associated with the first parent dataset and by storing, within a dependency data structure, a first preloaded representation of the first parent dataset. The system may receive a first request for a deployment database. The first request may include an indication of the first structured data. Based on the first request, the system may retrieve, from the dependency data structure, the first preloaded representation of the first parent dataset. The system may generate, for deployment to a target system, the deployment database including at least a portion of the first preloaded representation of the first parent dataset. This portion of the first preloaded representation may include the first data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative diagram of structured data, in accordance with one or more embodiments.

FIG. 1B shows an illustrative schematic of metadata sets associated with column data, in accordance with one or more embodiments.

FIG. 1C shows an illustrative schematic of a dependency data structure, in accordance with one or more embodiments.

FIG. 1D shows an illustrative schematic of a metadata structure associated with a deployment database, in accordance with one or more embodiments.

DETAILED DESCRIPTION

Figure 1E:
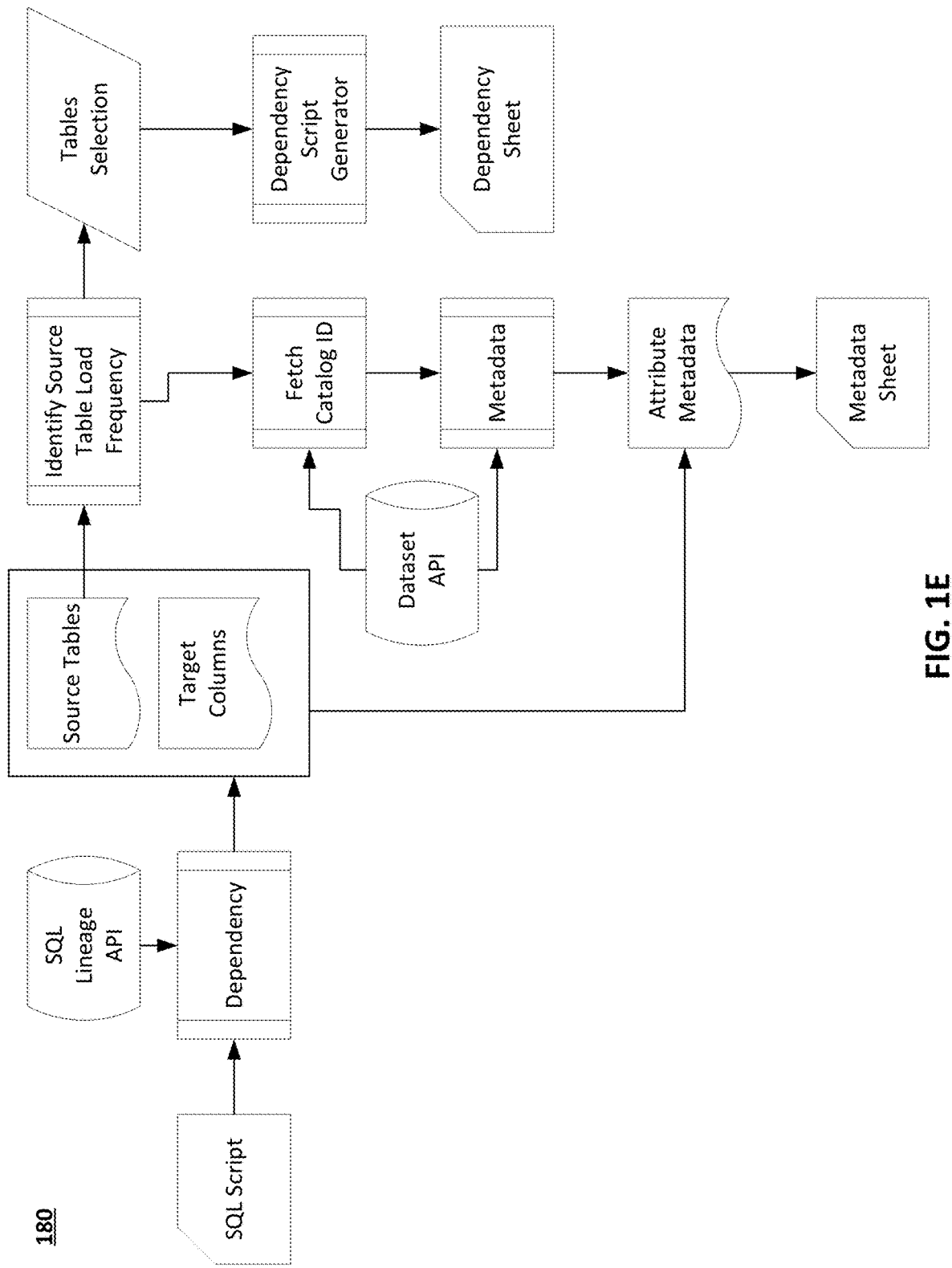
FIG. 1E shows an illustrative diagram for a flow for generating dependency data and metadata for automated database generation and deployment, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative diagram of structured data 100, in accordance with one or more embodiments. For example, FIG. 1A illustrates a dataset (e.g., tabulated data, such as a table) or other structured data to be included within a deployment database associated with source data from parent databases. Structured data 100 may include column data, including data from column 102a, column 102b, and column 102c. As an illustrative example, structured data 100 may include information relating to user accounts associated with an account management system. For example, Column A (e.g., corresponding to column 102a) may correspond to a first number of accounts associated with a first user account type. Column B (e.g., corresponding to column 102b) may correspond to a second number of accounts associated with a second user account type. Column C (e.g., corresponding to column 102c) may include a sum of the first number of accounts and the second number of accounts. As such, structured data 100 may include information from different source databases or tables (e.g., if column 102a and column 102b differ in source). Generation of column 102c may include proper integration of the data within both columns 102a and 102b for generation of the target database (e.g., the deployment database).

For example, a dataset (e.g., tabulated data) may be associated with a source database and/or a target database. A database may include a collection of data, including in the form of a data structure (e.g., structured data) or in the form of a repository of information. For example, a database includes components that store tabular data or enable linking of data between different tables or data structures (e.g., enabling dynamic updating of columns of data based on data from other portions of the database). In some embodiments, a database includes indexing, concurrency controls, access controls, and performance/technical constraints (e.g., including bandwidth/data transfer constraints, storage requirements, or other suitable requirements). For example, a structured database may use tables (e.g., in the context of relational databases), trees, graphs, or other predetermined data organization methods. Databases may be stored on one or more devices (e.g., in the case of distributed databases). A database may provide access to users or developers through application programming interfaces, network connections, or other suitable communication links. In some embodiments, a system may generate a database (e.g., a target database) for deployment. For example, a deployment database may include a database for which an interface exists for the creation, management, and running of applications based on the database. A deployment database may be accessible through a graphical user interface (GUI), a command line interface, or another interface. As such, a deployment database may be exposed to users beyond the system associated with the database and may benefit from control of access, performance, or other features.

A database may include structured or unstructured data (e.g., within datasets), such as values, characters, quantities, qualities, facts, statistics, or other suitable information.

Structured data may include information stored, generated, or displayed with a predetermined structure, such as tabulated data or in another type of dataset. Tabulated data may include data arranged in rows, columns, and/or higher-dimensional components (e.g., in the case of a three-dimensional or n-dimensional table). In some embodiments, tabular data includes rows (e.g., records, k-tuples, n-tuples, or vectors), where each element of a row is associated with a corresponding column (e.g., field, parameter, property, attribute, or stanchion). For example, structured data 100 shown in FIG. 1A may include column 102a, which may include a set of values (e.g., or other suitable data) arranged in rows. Such data (e.g., in tabulated form and/or within suitable databases) may include information associated with user accounts, such as user account numbers, user identifiers, and user account values (e.g., storage allotments to a user associated with a storage system or monetary values associated with digital assets associated with a user of a bank account). In some embodiments, datasets may include identifiers (e.g., table identifiers). An identifier may include a file path, a unique value (e.g., a serial number), or another token that enables identification of datasets, databases, or associated data. For example, an identifier enables retrieval or tracking of data sources (e.g., through an application programming interface that includes dataset or database search and retrieval functions).

Columns or other portions of a database may be associated with parent tables or other data sources (e.g., source tables). For example, column 102a may derive from or may reflect data within a first database or a first table, while column 102b may derive from or may reflect data within a second database. In some embodiments, structured data 100 may be associated with the creation of a target database (e.g., for deployment) and may include values that are dynamic and/or calculated on the basis of other data within or external to the target database. As an illustrative example, column 102c (e.g., Column C of FIG. 1A) may depend on columns 102a (e.g., Column A) and 102b (e.g., Column B). For example, column 102c may represent a row-wise sum (or another suitable operation) of elements within columns 102a and 102b. Therefore, column 102c may depend on the source tables or databases corresponding to multiple columns, thereby complicating the generation of the structured data 100 for deployment if such tables have different attributes (e.g., differing metadata). In some embodiments, structured data includes identifiers (e.g., indications of structured data), which may include column identifiers, such as keywords, values (e.g., indices), serial numbers, or other methods for identification. By including (e.g., generating, identifying, or storing) identifiers, the system enables the generation and tracking of portions of databases on the basis of column data, thereby enabling the generation of databases on the basis of specified portions (e.g., particular columns) of other datasets.

FIG. 1B shows illustrative schematic 120 of metadata sets (e.g., attributes) associated with column data, in accordance with one or more embodiments. For example, columns 102a, 102b, and 102c may be associated with differing attributes (e.g., parent table(s) 122, previous updates 124, and/or source file paths 126). By generating a deployment database that accounts for these differences in column source and attributes, the disclosed system enables efficient, accurate integration of heterogeneous data for automated database generation.

For example, the system may determine or identify parent datasets, such as parent table(s) 122 shown in FIG. 1B, associated with columns associated with a target database (e.g., columns 102a-c). A parent dataset may include data (e.g., values) associated with child data (e.g., data within a target or deployment database). For example, a parent dataset includes a table associated with another database or another table within a database. To illustrate, the system may determine user account data associated with an account management system from various sources. Column 102a (e.g., Column A shown in FIG. 1A) may include a first set of values associated with each user account in the account management system (e.g., a storage allotment associated with a parent table in a storage permissions database or a monetary value associated with a parent table in a bank account database), while column 102b (e.g., Column B shown in FIG. 1B) may include a second set of values associated with each user account (e.g., a storage use value associated with a parent table in a storage utilization database or a debt value associated with a parent table in a credit reporting database). As such, column 102a may be associated with a first parent table (e.g., Parent Table 1 shown in FIG. 1B), while column 102b may be associated with another parent table (e.g., Parent Table 2 shown in FIG. 1B). Parent datasets (e.g., parent tables) may be identified through corresponding table identifiers, such as through source file paths 126. A file path may include a string of characters for unique identification of a location within a directory structure (e.g., within a database or a distributed/undistributed computing system).

In some implementations, a given portion of a dataset (e.g., a column of a table) may be associated with more than one parent dataset. For example, column 102c (e.g., Column C of FIG. 1A) may be dependent on other columns (e.g., Columns A and B of FIG. 1A) such that column 102c has multiple parent datasets. For example, Column C may represent a proportion of storage use to storage allotment (e.g., a row-wise division of Column B by Column A). Additionally or alternatively, Column C may represent a proportion of debt to stored monetary value (e.g., a row-wise division of Column B by Column A). As such, the parent datasets of Column C may include both Parent Table 1 and Parent Table 2. By determining parent datasets (e.g., datasets from which other datasets are derived), the disclosed system enables tracking of dependencies and attributes associated with data from different sources, thereby enabling flexible, automated handling of such differences.

Columns and/or parent datasets may be associated with timestamps. For example, a timestamp may include an indication of the time of an event, such as a previous update to a given dataset or a column. To illustrate, columns 102a-c may include corresponding timestamps that mark the times of previous updates 124 when values within columns were modified. For example, data within columns 102a-c may be updated with different temporal periodicities-a column associated with monetary values may be updated more frequently than a column associated with financial debt for a given user. As such, by tracking update times associated with columns and/or the associated parent datasets (e.g., parent tables), the system obtains information relating to the volatility of information within different components (e.g., columns) of the target database.

In some embodiments, data associated with a given column may be of a particular format. A format may include information relating to data (e.g., values within the column), including a variable type, privacy requirements (e.g., access control indicators, as described below), updating procedure, performance requirements, or data structure. For example, a format may include an indication of the structure, attributes, and/or characteristics of data (e.g., a given column) based on associated metadata, such as an associated metadata set, as described below. By enabling integration of data of heterogeneous formats, the system improves the accuracy and flexibility of database generation.

FIG. 1C shows an illustrative schematic of dependency data structure 140, in accordance with one or more embodiments. For example, dependency data structure 140 includes cache 142, which may include a preloaded representation of a parent dataset (e.g., of Parent Table 1). Cache 142 may include structured data, such as a representation of column 102a, column 144 (e.g., Column D of FIG. 1C), and/or column 146 (e.g., column E of FIG. 1C). By loading information relating to dependencies (e.g., parent datasets) for a target database in an update rate-dependent manner, the system enables efficient and accurate retrieval of information used within the target database.

A dependency data structure may include a data structure that includes information, data, or values on which another dataset depends (e.g., a dataset associated with the target/ deployment database). For example, a dependency data structure includes columns of parent datasets that are used, manipulated, or calculated within a target database (e.g., a dataset for deployment). In some embodiments, a dependency data structure may be stored or preloaded (e.g., within a cache) such that the generation of a subsequent dataset based on this data is computationally efficient. For example, a dependency data structure includes some or all columns of the structured data to be included within the target dataset. To illustrate, FIG. 1C depicts that cache 142 includes Column A (e.g., column 102a), as included in structured data 100. In some embodiments, the dependency data structure does not include all information from parent datasets that are incorporated within a target database. For example, dependency data structure 140 may include data from parent datasets based on an update rate of the parent datasets (e.g., a low update rate compared to other parent datasets associated with the same target database) in order to preload data that is unlikely to change over time. By doing so, the system improves the accuracy of the preloaded data and prevents the need to update the target database subsequently.

For example, the system may generate, determine, or retrieve a preloaded representation of a parent dataset (e.g., a parent table or columns thereof). The preloaded representation may include data, values, or information of a parent dataset stored in an accessible location (e.g., using relatively few computational resources). For example, the preloaded representation may include a cached representation of the parent dataset (and/or a buffered representation of the parent dataset). A cached representation of data may include data stored within a cache (e.g., a hardware or software component that stores data such that requests for the data are satisfied efficiently). For example, the system may store the data (or a representation of the data, such as a compressed version of the data) within a central processing unit or graphics processing unit cache. In some embodiments, the cached representation includes a representation of the data within a disk cache, a web cache, a cloud storage gateway, or another cache. By doing so, the system improves the efficiency of database construction on the basis of dependencies (e.g., columns of data associated with parent datasets stored elsewhere).

For example, the system may utilize an application programming interface to retrieve information relating to parent datasets (e.g., dependency data structure 140). An application programming interface (API) may include a communication method (e.g., program, module, or method) for communication between two or more computer programs. For example, an API may include a program configured to retrieve, search, or identify parent tables (e.g., parent datasets or associated databases) based on individual columns of data. For example, the system may generate a request to an API for identification and/or retrieval of data associated with a given column of the tabulated data for a target database (e.g., the deployment database). In response to this request, the system may receive, via the API, an indication of the parent table (e.g., a table identifier, such as a file path). Based on this indication (or otherwise), the system may retrieve the parent table (or a representation thereof) accordingly. As such, APIs enable retrieval of dependencies to enable preloading data to be incorporated within a target database, thereby improving the efficiency of the system.

Parent datasets and/or data therein (e.g., column data within a parent dataset) may be associated with an update rate (e.g., update rate 168). An update rate may include a value associated with the frequency of modifications, updates, or changes (e.g., additions or deletions) associated with a dataset or other data. For example, an update rate may include an indication of a number of updates per unit time (e.g., updates per second) made to a given database. In some embodiments, the update rate may reflect a frequency of requests for the data made by the system or another system (e.g., a refresh rate). In some cases, a particular table or dataset may exhibit a higher or a lower update rate than another table or dataset. For example, user account data associated with a user's financial debt may be updated or modified less frequently than information relating to the user's bank account balance (e.g., monetary value). The system may determine or generate an update rate for a given dataset based on timestamps associated with updates to this data (e.g., based on timestamps associated with previous updates 124). For example, the system may determine an average update rate by determining a number of timestamps associated with updates to a given dataset. The system may generate an average update rate by dividing this number of timestamps by an elapsed time encompassing these timestamps, thereby determining an average update frequency. By determining update rates (e.g., update frequencies) associated with datasets, the system may determine data and/or databases that are likely to change relatively infrequently (e.g., in response to rapidly changing data). The system may determine to preload (e.g., within cache 142) data that is likely to remain static (e.g., with a low update rate, e.g., compared to a threshold update rate). By doing so, the system may improve the efficiency of generating databases by limiting the need to load or reload data associated with slow-changing datasets.

In some embodiments, the system may determine to preload data associated with a given dataset based on determining a change in update rate. For example, the system may determine a modified update rate associated with a change in the update frequency (e.g., a rolling average update frequency) associated for a given dataset (e.g., for a given column and/or the corresponding parent table). To illustrate, the system may detect that a number of accounts are accruing increasing amounts of financial debt and, as such, a database associated with this information must be updated more often to maintain accuracy. The system may detect a modified update rate based on determining a difference in update rates between a first time and a second time and comparing this difference with a threshold value. By doing so, the system may dynamically adapt to the volatility or changeability of components of a target database, thereby improving the accuracy and efficiency of the system.

FIG. 1D shows an illustrative schematic of metadata structure 160 associated with a deployment database, in accordance with one or more embodiments. For example, metadata structure 160 includes a data structure that includes metadata sets associated with parent tables associated with the deployment database (e.g., quality of service indicators 164 and access control indicators 166 for Parent Tables 162a and 162b). In some implementations, the system may generate metadata sets associated with the deployment database itself (e.g., for deployment database 162c based on structured data 100 of FIG. 1A) based on the metadata sets associated with the associated parent tables. As such, the system enables the generation of databases according to restrictions, rules, or attributes embodied within metadata.

For example, a metadata set may include information associated with data, datasets, or databases (e.g., tables). A metadata set may include information relating to the security, performance, or technical requirements associated with given data (e.g., a column of structured data and/or data within a parent dataset). In some embodiments, the metadata set includes an access control indicator and/or a QoS indicator. Additionally or alternatively, the metadata set includes any information relating to the format of the associated data and/or dataset. For example, a metadata set includes requirements, criteria, or rules associated with the integration of a given dataset within a database, including protocols controlling access to the database, data quality, and/or performance requirements (e.g., hardware or software requirements) associated with the data. In some embodiments, metadata sets associated with parent tables may be accessible with an API (e.g., through a second API distinct from a first API for retrieval of the parent tables themselves). Additionally or alternatively, the metadata sets may be accessible through the same API. By obtaining such data with respect to the parent tables, the system may maintain the consistency of the metadata associated with the deployment database to ensure any required performance, privacy, or security constraints are in place.

The metadata set for a given dataset may include an associated access control indicator (e.g., as related to a parent table or associated column data). An access control indicator may include information associated with access to the given data. For example, the access control indicator may include a user permission indicator, such as a flag indicating a security level associated with the data (e.g., a quantitative or qualitative authentication level above which users must be authorized). For example, the access control indicator exhibits a flag indicating high, medium, or low clearance requirements for users to access the associated data. In some embodiments, the access control indicator includes a list of user identifiers (e.g., usernames, account numbers, or other identifiers of users of a system, such as a bank account system or an account management system). For example, an access control indicator may include a set of user identifiers for which access to the associated data is allowed or prohibited. By including access control indicators, the system enables control of access to databases or components of such databases (e.g., particular tables or columns). For example, the system may require user credentials depending on flags associated with the access control indicators in response to a request from a user to access associated data. The system may combine datasets associated with different access control indicators to generate a deployment database (e.g., by generating a QoS indicator for the deployment database that corresponds to the more restrictive access control requirement associated with the parent tables). As such, the system enables integration of disparate data within a deployment database in a manner that maintains the security and privacy requirements associated with the underlying data.

The metadata set for data (e.g., for a parent table or associated databases from which the deployment database derives) may include an associated QoS indicator. A QoS indicator may include an indication of a performance and/or technical requirement associated with given data. For example, a QoS indicator may include an indication of a maximum data transfer rate associated with accessing data of a given database or dataset. For example, a data transfer rate includes a maximum bandwidth or transfer size per unit time associated with transmitting or receiving the associated data. In some embodiments, the QoS indicator indicates a required performance or hardware requirement associated with a device accessing the associated data.

A QOS indicator may include qualitative indicators (e.g., "unconstrained," "limited," and/or "unavailable") and/or quantitative indicators (e.g., specific values associated with data access). As such, QoS indicators enable the system to limit or manage system resources by preventing system overuse or diminished performance. Different datasets may include different QoS indicators depending on the urgency and/or importance of such data. The system may combine datasets associated with different QoS indicators to generate a deployment database (e.g., by associating the lower of the parent datasets' QoS indicators with the deployment database). As such, the system enables integration of disparate data within a deployment database in a manner that maintains the resource efficiency of the associated system.

FIG. 1E shows an illustrative diagram for flow 180 for generating dependency data and metadata for automated database generation and deployment, in accordance with one or more embodiments. For example, the system may receive a script (e.g., an SQL script), as well as information relating to associated dependencies (e.g., through an SQL lineage API). The system may retrieve a list of source tables and target columns for respective source tables.

The system may identify a load frequency associated with the source tables. Depending on the load frequency, the system may transmit a request to a dataset API for information relating to metadata associated with the target columns (e.g., by fetching a catalog identifier and associated metadata). Using the metadata, the system may obtain attribute metadata associated with the target columns and generate a metadata artifact to include this information. The system may select tables for generation of a dependency script (e.g., through a dependency script generator) depending on the load frequency, thereby enabling rarely updated data to be loaded more efficiently during database deployment. Moreover, using the dependency script, the system may generate dependency information for a target database prior to deployment. As such, the system enables automated, efficient generation of dependency data and metadata for databases to be deployed, thereby enabling improvements to software development productivity.

Figure 2:
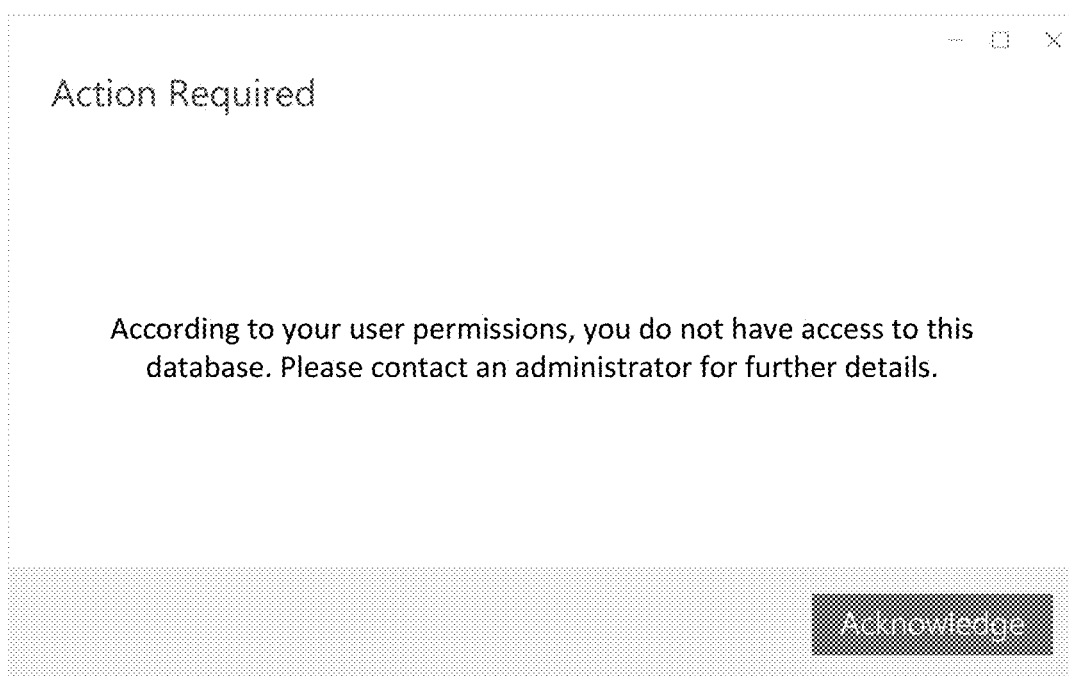
FIG. 2 shows an illustrative diagram for a user interface capable of enforcing access controls using access control data associated with the metadata structure, in accordance with one or more embodiments.

FIG. 2 shows an illustrative diagram for user interface 200 capable of enforcing access controls using access control data associated with the metadata structure, in accordance with one or more embodiments. For example, the system may generate a message indicating access or performance information associated with the deployment database. The system may generate this message for display on a user interface (e.g., of a mobile device communicating with a target system associated with a deployment database). For example, the message may indicate that a given user does not have access to a given deployment database (e.g., and that the user must contact an administrator accordingly). By doing so, the system may enforce any applicable access control requirements and/or QoS requirements for the deployment database, as well as any other constraints or criteria associated with the associated metadata structure.

For example, the deployment database may be deployed to a target system. The target system may include a subsystem of a larger system (e.g., an account management system). For example, the target system may include devices of an account management system (or another computing system) and may be distributed (e.g., as in cloud computing) or non-distributed (e.g., associated with a single set of hardware). In some embodiments, user devices (e.g., mobile devices) may communicate with the target system, such as through a network, for access to the deployment database thereof.

For example, the system may receive a user request for access to the deployment database (e.g., the target database). Based on the request, the system may generate an access denial message (e.g., where an authorization status of the user is not satisfactory given the access control indicator of the corresponding metadata structure). For example, the system may determine a user identifier associated with the user request for access to the deployment database. The system may determine that the user identifier is inconsistent with the access control indicator associated with an access control indicator associated with the metadata structure and determine to deny access to the user based on this determination. By doing so, the system may enforce access control indicators in a manner that is consistent with the indicators associated with one or more of the parent tables of the database and/or of the database itself.

In some embodiments, the system may request and/or obtain user credentials associated with the user requesting access to the deployment database. The system may determine that the user identifier associated with this user is indeed consistent with the metadata structure (e.g., an access control indicator). For example, the system may receive a password, username, multi-factor authentication code, and/or other information for validation of the user's identity. Based on this information, the system may validate the user's authorization status for accessing the given database. For example, the authorization status may include an indication of the authenticity of the user's identity. For example, the authorization status may indicate that the user credentials are consistent with the user identifier and/or that the user identifier is consistent with one or more access control indicators associated with the metadata structure of the deployment database. By doing so, the system may protect the system against unauthorized access to sensitive data within the deployment database, consistent with the applicable access control indicators and other suitable metadata, by protecting against fraudulent attempts to access such data.

Figure 3:
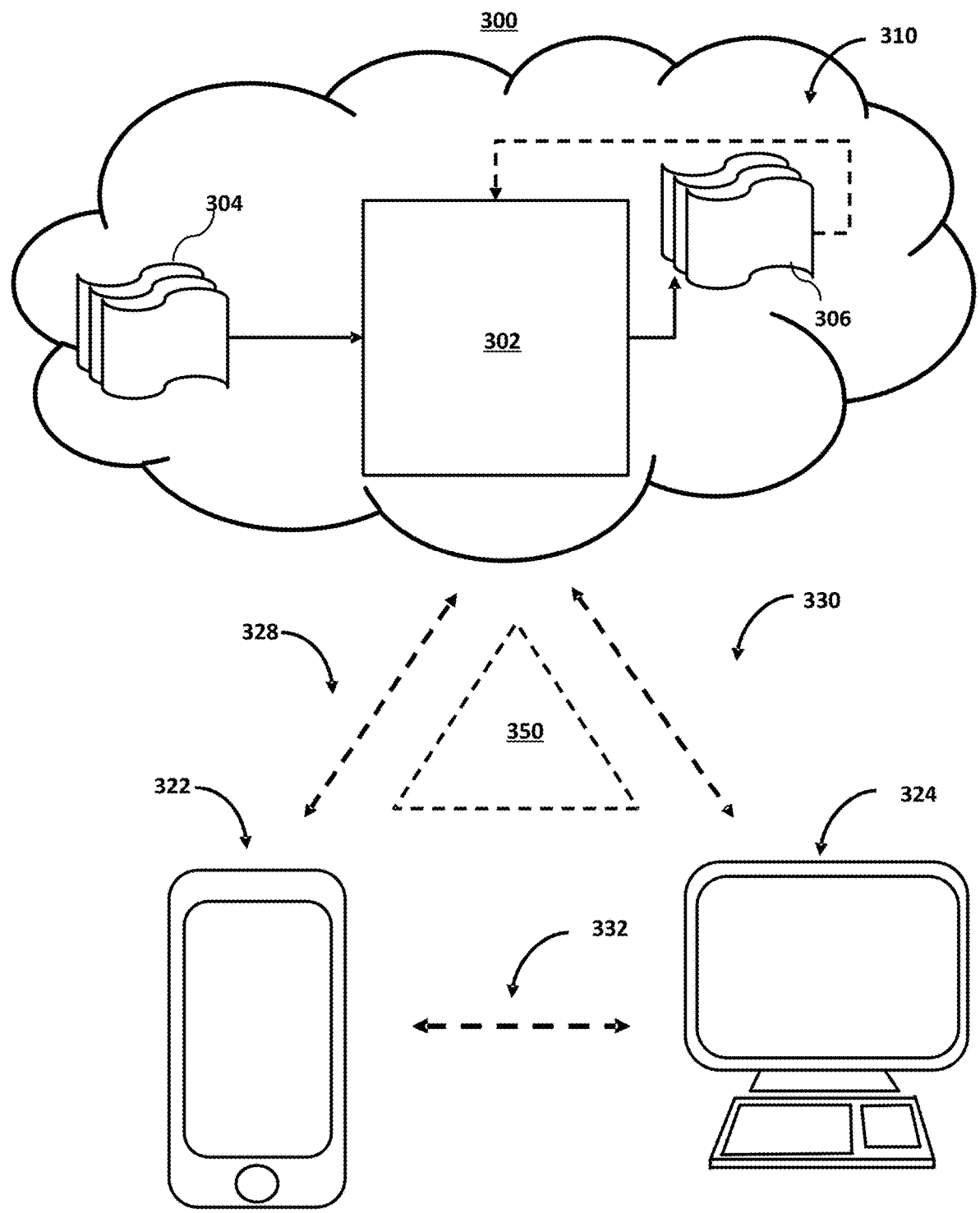
FIG. 3 shows illustrative components for a system used to generate databases through update rate-dependent integration of heterogeneous data, in accordance with one or more embodiments.

FIG. 3 shows illustrative components for a system used to generate databases through update rate-dependent integration of heterogeneous data, in accordance with one or more embodiments. For example, FIG. 3 may show illustrative components for integrating user account data from various account databases with differing account permissions and database update rates. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may include any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and personal computer, respectively, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include databases, such as structured databases and/or deployment databases. For example, cloud components 310 may include tabulated data, as well as associated metadata sets and dependency data. For example, cloud components 310 may retrieve access control indicators, QoS indicators, timestamps, update rates, or other information associated with data within a database.

Cloud components 310 may access APIs, internal and third-party databases (e.g., external to the system), user credential information, user permission information, security information, privacy information, hardware performance information, and other suitable information for generation of a deployment database and subsequent enforcement of metadata-based access controls.

Cloud components 310 may include model 302, which may be a machine learning model, an artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., an access control indicator and/or a QoS indicator associated with a given deployment database).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections may be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and may perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., whether a user is an authorized user for accessing a deployment database with a given QoS indicator or access control indicator).

In some embodiments, the model (e.g., model 302) may automatically perform actions based on outputs 306. In some embodiments, the model (e.g., model 302) may not perform any actions. The output of the model (e.g., model 302) may be used to generate deployment databases and/or associated dependency data structures or metadata structures.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350 such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDOS protection, and API layer 350 may use RESTful APIs as standard for external integration.

Figure 4:
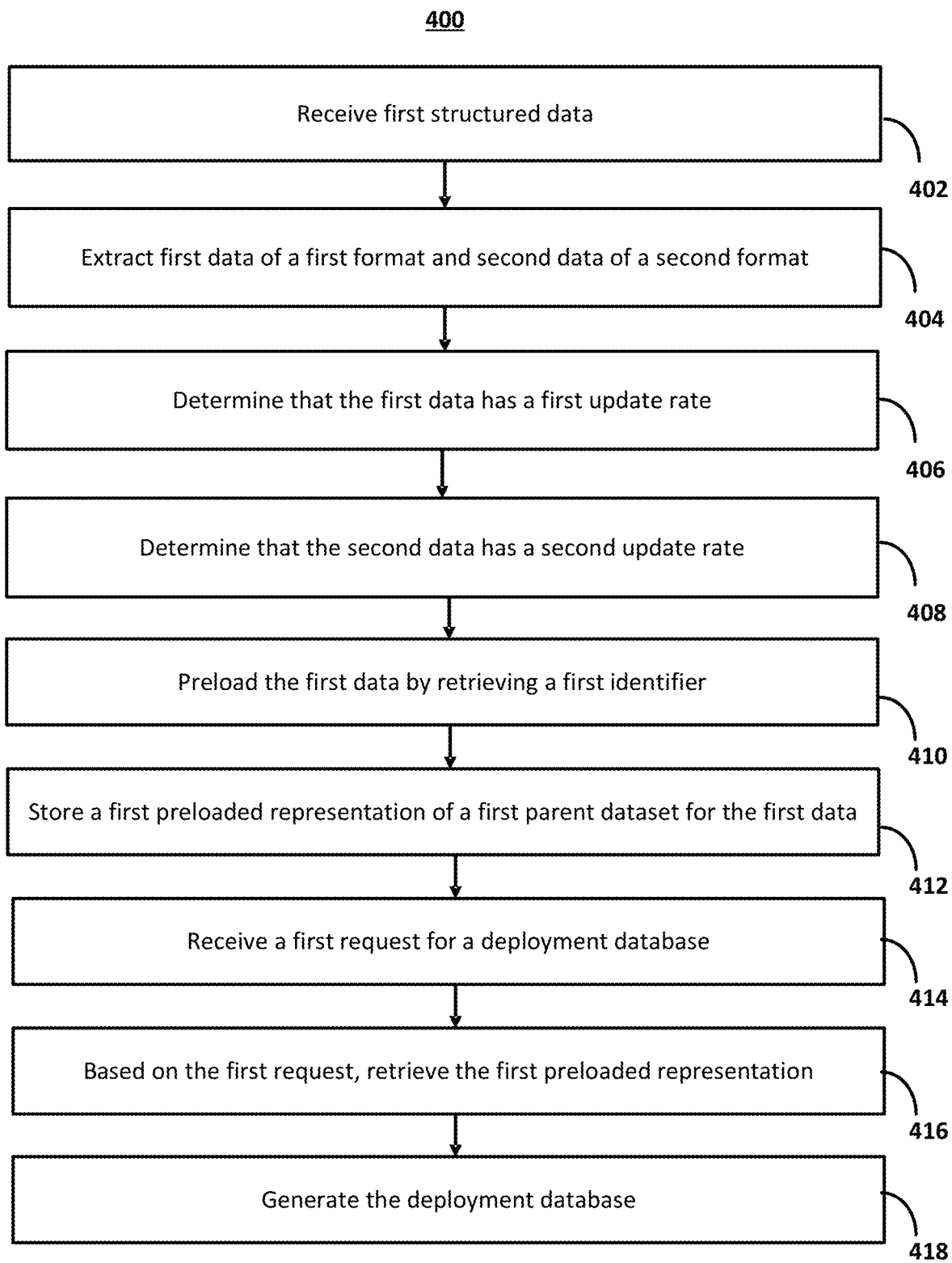
FIG. 4 shows a flowchart of the steps involved in generating deployment databases based on data from distinct sources and with distinct metadata, in accordance with one or more embodiments.

FIG. 4 shows a flowchart of the steps involved in generating deployment databases based on data from distinct sources and with distinct metadata, in accordance with one or more embodiments. For example, the system may use process 400 (e.g., as implemented on one or more system components described above) in order to generate deployment databases (e.g., associated with user account data) based on heterogeneous data with differing user permissions and/or differing update rates in an efficient and secure manner.

At operation 402, process 400 (e.g., using one or more components described above) enables the system to receive structured data. For example, the system may receive, from a first database, first structured data. As an illustrative example, the system may receive tabulated data with multiple columns of data that are dependent on various sources. A first column of the tabulated data may be associated with account-related values for a first type of account (e.g., a bank account balance associated with users), while a second column of the tabulated data may correspond to account-related values for a second type of account (e.g., a credit usage level associated with users), where such columns originate in different datasets or databases with different properties, attributes, update rates, or permissions. As such, the system enables integration of such heterogeneous data, improving the efficiency of database generation based on different datasets.

At operation 404, process 400 (e.g., using one or more components described above) enables the system to extract first data and second data from the received structured data. For example, the system may extract, from the first structured data, first data of a first format associated with a first parent dataset and second data of a second format associated with a second parent dataset. The first data may include a first timestamp, and the second data may include a second timestamp. As an illustrative example, the system may extract the first column (e.g., corresponding to bank balances) and the second column (e.g., corresponding to credit usage). As an illustrative example, the system may extract the bank account balance information (derived from a first bank account dataset) and the credit usage information (derived from a credit account dataset). By doing so, the system enables the integration of data arising from different datasets and/or with different security or privacy attributes within the same target database.

At operation 406, process 400 (e.g., using one or more components described above) enables the system to determine a first update rate for the first data. For example, the system may determine that the first data has a first update rate based on the first timestamp. As an illustrative example, the system may determine that the first data (e.g., the bank account information associated with users' bank balances) is updated frequently based on timestamps associated with such updates. For example, bank account balances may change often, potentially requiring frequent updates to related databases. As such, the system may determine an update rate for this database to determine the volatility of such data over time, thereby enabling improved selection of preloaded data in order to improve the efficiency of generating target databases based on this bank account information.

In some embodiments, the system may determine update rates based on an average update frequency from timestamps associated with updates to suitable datasets. For example, the system may obtain a plurality of timestamps associated with updates to the first parent dataset. The plurality of timestamps may include the first timestamp. The system may determine, from the plurality of timestamps, a subset of timestamps associated with updates to the first data. The system may determine an average update frequency associated with the subset of timestamps. The system may determine, based on the average update frequency, that the first data has the first update rate. For example, the system may extract a set of timestamps associated with updates to data (e.g., modification timestamps) and determine an average update frequency accordingly. For example, the system may determine that a bank account database is updated multiple times on a daily basis based on associated update timestamps and may determine the average update frequency accordingly. By doing so, the system may determine the stability or volatility of a given database in order to determine whether such data may be preloaded into a database prior to deployment. As such, the system may improve the efficiency of deployments on the basis of such preloaded data.

At operation 408, process 400 (e.g., using one or more components described above) enables the system to determine a second update rate for the second data. For example, the system may determine that the second data has a second update rate based on the second timestamp. As an illustrative example, the system may determine that the second data (e.g., credit account information associated with users' financial debt) is updated frequently based on timestamps associated with such updates. For example, credit account balances may change more rarely than bank account balances. As such, the system may prefer to preload credit account balances over bank account balances. By doing so, the system may improve the stability and accuracy of data within a target database based on this data.

At operation 410, process 400 (e.g., using one or more components described above) enables the system to preload the first data based on the first update rate and/or the second update rate. For example, in response to determining that the first data has a first upload rate, the system may preload the first data by retrieving, using a first application programming interface, a first identifier associated with the first parent dataset. For example, the system may determine that the first data has an upload rate that is less than a threshold update rate. Based on this determination, the system may determine that this data (e.g., the bank account-related data) is stable enough to be preloaded into a cache (e.g., a software or a hardware store). As such, the system may retrieve an identifier of this data (e.g., a file path or another unique identifier that enables retrieval of the data) in order to obtain the bank account data for preloading into the deployment database. By doing so, the system may locate relevant data (e.g., data from parent datasets) that may be added to the database in an efficient manner.

In some embodiments, the system may determine to preload the first data by determining that the second update rate is greater than the first update rate. For example, the system may compare the first update rate and the second update rate. Based on determining that the second update rate is greater than the first update rate, the system may preload the first data. As an illustrative example, the system may determine that the update rate associated with the second parent dataset (e.g., an update rate associated with credit usage information) is greater than that of a first parent dataset (e.g., an update rate associated with bank account information). Based on this determination, the system may determine that the first parent dataset is less likely to change than the second parent dataset is and, therefore, that a representation of this first dataset may be preloaded into a cache for efficient generation of the deployment database. By doing so, the system improves the efficiency of database generation while ensuring the accuracy of data therein.

In some embodiments, the system may determine to preload the second data. For example, the system may compare the first update rate and the second update rate. Based on determining that the first update rate is greater than the second update rate, the system may preload the second data. As an illustrative example, the system may determine that the update rate associated with the first parent dataset (e.g., an update rate associated with bank account information) is greater than that of the second parent dataset (e.g., an update rate associated with credit usage information). Based on this determination, the system may determine that the second parent dataset is less likely to change than the first parent dataset is and, therefore, that a representation of the second dataset may be preloaded into a cache (e.g., instead of or in addition to a representation of the first dataset) for efficient generation of the deployment database. By doing so, the system improves the efficiency of database generation while ensuring the accuracy of data therein.

In some embodiments, the system may preload the first data by determining that a threshold update rate is greater than the first update rate. For example, the system may compare the first update rate and a threshold update rate. In response to determining that the threshold update rate is greater than the first update rate, the system may preload the first data. As an illustrative example, the system may determine that the first data (e.g., column data associated with bank account information) has a relatively small update rate compared to a predetermined threshold value. Based on this determination, the system may determine to preload the first data, thereby improving the efficiency of database generation while reducing the likelihood of inaccuracies due to changing data associated with the bank account information.

In some embodiments, the system may preload the second data by determining that the second data exhibits an updated or modified update rate. For example, the system may determine a third update rate associated with the second data. The system may determine a difference between the third update rate and the second update rate. Based on comparing the difference with a threshold value, the system may determine that the second data has a modified update rate. Based on determining that the second data has the modified update rate, the system may preload the second data. As an illustrative example, the system may detect changes in the update rate associated with a given dataset (e.g., a given column). For example, the system may determine that credit usage information is less frequently updated than previously. Based on this determination, the system may determine to preload this data within a dependency data structure for efficient generation of the deployment database. For example, the system may detect a change in the rolling average rate of updates to credit score data and preload this second dataset accordingly.

At operation 412, process 400 (e.g., using one or more components described above) enables the system to preload the first data based on the first update rate and/or the second update rate by storing the first preloaded representation within a dependency data structure. For example, in response to determining that the first data has a first upload rate, the system may preload the first data by storing, within a dependency data structure, a first preloaded representation of the first parent dataset. As an illustrative example, the system may store the preloaded representation of the data within a dependency data structure, such as a cache. The system may determine to store the bank account information (e.g., bank balance information or other relevant data) within a hardware or software cache associated with the account management system for efficient loading of the data during database generation. By doing so, the system improves the efficiency of database generation while ensuring that only data associated with a low update rate is preloaded to reduce the likelihood of inaccuracies due to changing data.

In some embodiments, the system may store the preloaded representation by storing values associated with one or more parent datasets. For example, the system may determine a plurality of values of the first parent dataset. The system may store, within the dependency data structure, the plurality of values. As an illustrative example, the system may determine to preload values associated with the first parent dataset (e.g., individual values of bank account information for different users). By doing so, the system may improve the efficiency of the generation of databases, as values associated with dependencies (e.g., parent datasets) are easily accessible during database deployment.

In some embodiments, the system may store the preloaded representation by storing values associated with portions of one or more parent datasets. For example, the system may determine a plurality of values of the first parent dataset. The system may determine a subset of the plurality of values. Each value of the subset may correspond to a portion of the first data of the first format. The system may store, within the dependency data structure, the subset of the plurality of values. As an illustrative example, the system may only load certain values that are associated with the parent datasets. For example, the system may determine only to preload data included in columns within the structured data to be included in the deployment database (e.g., bank account balance information) while excluding other data of the first parent dataset from the preloaded dependency data structure (e.g., other bank account-related information). By doing so, the system reduces the burden of caching (e.g., preloading) on the computational resources of the account management system by preventing the need to store data of the parent datasets that is not relevant to the target database.

At operation 414, process 400 (e.g., using one or more components described above) enables the system to receive a request for a deployment database that includes an indication of the structured data. For example, the system may receive a first request for a deployment database. The first request may include an indication of the first structured data. As an illustrative example, the system may receive a request for generation of a deployment database that includes the structured data. For example, the system may receive a request from a software developer associated with the account management system to generate a database that incorporates information from an associated bank account database, as well as an associated credit usage database. By receiving such a request, the system may determine to deploy the associated deployment database efficiently and in an automated fashion based on any associated preloaded dependencies as well as any associated metadata (e.g., in some embodiments).

At operation 416, process 400 (e.g., using one or more components described above) enables the system to retrieve the preloaded representation of the first parent dataset based on the first request. For example, based on the first request, the system may retrieve, from the dependency data structure, the first preloaded representation of the first parent dataset. As an illustrative example, the system may retrieve, from a cache associated with the account management system, the relevant dependency information, such as bank account and/or credit usage information, associated with parent databases (e.g., bank account or credit usage databases). By relying on easily retrievable cached values of the structured data to be included within the deployment database, the system improves the efficiency of automated database generation where the database is dependent on various data of differing sources and attributes (e.g., update rates).

At operation 418, process 400 (e.g., using one or more components described above) enables the system to generate the deployment database for deployment to a target system. For example, the system may generate, for deployment to a target system, the deployment database including at least a portion of the first preloaded representation of the first parent dataset. At least the portion of the first preloaded representation may include the first data. As an illustrative example, the system may generate the deployment database for user access by using the representation (e.g., the cache) of the preloaded dependency data. For example, the system may generate the deployment database based on bank account information associated with users, where such bank account information has been previously preloaded for efficient retrieval and transmission to the user. By doing so, the system reduces the time needed for database deployment, thereby improving the efficiency of accessing data of the account management system.

In some embodiments, the system may generate a deployment database that includes a portion of data associated with the second parent dataset. For example, the system may preload the second data by retrieving, using a first application programming interface, a second identifier associated with the second parent dataset and storing, within the dependency data structure, a second preloaded representation of the second parent dataset. The system may generate the deployment database including at least a portion of the second preloaded representation of the second parent dataset. At least the portion of the second preloaded representation may include the second data. As an illustrative example, the system may determine to preload the second data, such as credit usage data corresponding to a credit usage database (e.g., a credit report database). By doing so, the system may increase the cached proportion of data within the deployment database, thereby improving the efficiency of database deployment upon request.

In some embodiments, the system may generate the deployment database to include metadata artifacts associated with the parent datasets that are relevant to the deployment database. For example, the system may transmit, using a second application programming interface, a request for metadata artifacts. The request for metadata artifacts may include the first identifier and a second identifier associated with the second parent dataset. In response to the request for metadata artifacts, the system may receive a first metadata set for the first parent dataset and a second metadata set for the second parent dataset. The first metadata set may correspond to the first format, and the second metadata set may correspond to the second format. The system may generate a metadata structure including the first metadata set and the second metadata set. The system may generate the deployment database including the metadata structure. As an illustrative example, the system may determine metadata information associated with the parent datasets from which the data within the deployment database originates. Such metadata information may include access requirements (e.g., access control indicators, such as privacy restrictions or user permissions), or QoS indicators (e.g., indications of maximum bandwidth/data transfer rates for access). The system may generate the deployment database such that access to the deployment database is consistent with such metadata information (e.g., consistent with QoS indicators or access control indicators), thereby preserving the security and performance characteristics of the deployment database, even in situations where components of the deployment database are heterogeneous.

In some embodiments, the system may generate the deployment database to include QoS indicators and access control indicators associated with the first and second metadata sets. For example, the system may determine, based on the first metadata set for the first data, a first access control indicator and a first QoS indicator. The system may determine, based on the second metadata set for the second data, a second access control indicator and a second QoS indicator. The system may provide access to the deployment database based on the first access control indicator, the first QoS indicator, the second access control indicator, and the second QoS indicator. As an illustrative example, the system may generate access control indicators, such as flags indicating the types of users with access to such data. Such access control indicators may include authorization levels required of users or associated user identifiers prior to obtaining access to the deployment database. In some embodiments, the system may generate QoS indicators that indicate maximum service standards (e.g., data transfer rates) associated with certain types of data. For example, different source databases (e.g., parent datasets) may include different QoS indicators due to differences in performance characteristics of underlying hosts or servers. As such, by incorporating metadata associated with dependency data from various sources, the system enables integration of such data and associated access requirements upon deployment of the target database.

In some embodiments, the system may control access to the deployment database by determining whether a user identifier for a user requesting access to the database is consistent with an associated access control indicator. For example, the system may receive, from a user device, a user request for access to the deployment database. The user request may include a user identifier. The system may determine that the user identifier is inconsistent with the first access control indicator. In response to determining that the user identifier is consistent with the first access control indicator, the system may generate, for display on a user interface associated with the user device, an access denial message. As an illustrative example, the system may generate a message that indicates that the user requesting access to the deployment database is ineligible for such access (e.g., due to an insufficient authorization level or invalid credentials). Such a determination may be based on an access control indicator associated with the associated parent datasets and/or the deployment database (e.g., metadata within the metadata structure). As such, the system enables the enforcement of access control restrictions inherited from parent datasets, ensuring the continued security of the deployment database.

In some embodiments, the system may control access to the deployment database by determining whether a user requesting access to the database is authentic. For example, the system may receive, from a user device, a user request for access to the deployment database. The user request may include a user identifier and corresponding user credentials. The system may determine that the user identifier is consistent with the first access control indicator. In response to determining that the user identifier is consistent with the first access control indicator, the system may determine, using the user identifier and the corresponding user credentials, an authorization status for the user request. The system may validate, based on the authorization status, the user device. Based on validating the user device, the system may generate, for display on a user interface associated with the user device, a graphical representation of the deployment database. As an illustrative example, the system may receive a password and/or a username from the user requesting access to the database. The system may compare the user credentials with stored, validated user credentials (e.g., as associated with an authorization database through an associated application programming interface) in order to validate the identity of the user. By doing so, the system may prevent fraudulent, unauthorized attempts to access sensitive data associated with the deployment database.

In some embodiments, the system may control the data transfer rate associated with accessing the deployment database based on the first QoS indicator. For example, the system may receive, from a user device, a user request for access to the deployment database. The system may compare the first QoS indicator and the second QoS indicator. Based on comparing the first QoS indicator and the second QoS indicator, the system may determine a first data transfer rate associated with the first QoS indicator. The system may transmit, at the first data transfer rate, a representation of the deployment database to the user device. For example, the system may determine a QoS indicator associated with a parent database that is lower than the other (e.g., a lower maximum data transfer rate) based on the comparison. In response to this determination, the system may determine to provide access to the database on the basis of this maximum data transfer rate (e.g., by throttling the connection to the target system housing the deployment database). By doing so, the system may control and improve the performance of the system, thereby ensuring that system resources and/or associated network connections are not burdened and improving system reliability.

In some embodiments, the system may determine the data transfer rate based on the second QoS indicator. For example, the system may receive, from a user device, a user request for access to the deployment database. The system may compare the first QoS indicator and the second QoS indicator. Based on comparing the first QoS indicator and the second QoS indicator, the system may determine a second data transfer rate associated with the second QoS indicator. The system may transmit, at the second data transfer rate, a representation of the deployment database to the user device. For example, the system may determine a QoS indicator associated with a parent database that is higher than the other (e.g., a higher maximum data transfer rate) based on the comparison. In response to this determination, the system may determine to provide access to the database on the basis of this maximum data transfer rate (e.g., by throttling the connection to the target system housing the deployment database). By doing so, the system may control and improve the performance of the system, thereby ensuring that system resources and/or associated network connections are not burdened and improving system reliability.

In some embodiments, the system may detect an update to the dataset and update the dependency data structure accordingly. For example, the system may detect a first update to the first parent dataset. Based on detecting the first update to the first parent dataset, the system may store, within the dependency data structure, an updated preloaded representation of the first parent dataset. The updated preloaded representation may include the first update to the first parent dataset. As an illustrative example, the system may determine that a dataset, of which data is stored within a cache, has been updated. Based on this detection, the system may update the cache with the updated information. By doing so, the system may ensure that information associated with the dependency data structure is accurate and not obsolete, thereby improving the accuracy of the deployment database.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a structured database, first tabulated data; extracting, from the first tabulated data, first column data of a first data format associated with a first parent table and second column data of a second data format associated with a second parent table, wherein the first column data is associated with a first timestamp and the second column data is associated with a second timestamp; determining that the first column data has a first update rate based on the first timestamp; determining that the second column data has a second update rate based on the second timestamp; in response to determining that the first column data has the first update rate, preloading the first column data by: retrieving, using a first application programming interface, a first table identifier associated with the first parent table, wherein the first table identifier comprises a file path of the first parent table, and storing, within a dependency data structure, a cached representation of the first parent table; obtaining a first metadata set for the first parent table and a second metadata set for the second parent table, wherein the first metadata set includes, for the first data format, a first access control indicator and a first Quality-of-Service (QOS) indicator, and wherein the second metadata set includes, for the second data format, a second access control indicator and a second QoS indicator; and generating, for deployment to a target system, a deployment database comprising the cached representation retrieved from the dependency data structure, the second parent table, the first metadata set, and the second metadata set, wherein the target system controls access to the deployment database according to the first and second metadata sets.

2. A method comprising: receiving, from a first database, first structured data; extracting, from the first structured data, first data of a first format associated with a first parent dataset and second data of a second format associated with a second parent dataset, wherein the first data comprises a first timestamp, and wherein the second data comprises a second timestamp; determining that the first data has a first update rate based on the first timestamp; determining that the second data has a second update rate based on the second timestamp; in response to determining that the first data has a first upload rate, preloading the first data by: retrieving, using a first application programming interface, a first identifier associated with the first parent dataset, and storing, within a dependency data structure, a first preloaded representation of the first parent dataset; receiving a first request for a deployment database, wherein the first request comprises an indication of the first structured data; based on the first request, retrieving, from the dependency data structure, the first preloaded representation of the first parent dataset; and generating, for deployment to a target system, the deployment database comprising at least a portion of the first preloaded representation of the first parent dataset, wherein at least the portion of the first preloaded representation comprises the first data.

3. A method comprising: receiving, from a first database, first structured data; extracting, from the first structured data, first data of a first format associated with a first parent dataset and second data of a second format associated with a second parent dataset, wherein the first data comprises a first timestamp, and wherein the second data comprises a second timestamp; determining that the first data has a first update rate based on the first timestamp; determining that the second data has a second update rate based on the second timestamp; in response to determining that the first data has a first upload rate, preloading the first data by: retrieving, using a first application programming interface, a first identifier associated with the first parent dataset, and storing, within a dependency data structure, a first preloaded representation of the first parent dataset; retrieving, from the dependency data structure, the first preloaded representation of the first parent dataset; and generating, for deployment to a target system, a deployment database comprising at least a portion of the first preloaded representation of the first parent dataset, wherein at least the portion of the first preloaded representation comprises the first data.

4. The method of any one of the preceding embodiments, wherein preloading the first data comprises: comparing the first update rate and the second update rate; and based on determining that the second update rate is greater than the first update rate, preloading the first data.

5. The method of any one of the preceding embodiments, further comprising: comparing the first update rate and the second update rate; and based on determining that the first update rate is greater than the second update rate, preloading the second data.

6. The method of any one of the preceding embodiments, further comprising: preloading the second data by: retrieving, using a first application programming interface, a second identifier associated with the second parent dataset, and storing, within the dependency data structure, a second preloaded representation of the second parent dataset; and generating the deployment database comprising at least a portion of the second preloaded representation of the second parent dataset, wherein at least the portion of the second preloaded representation comprises the second data.

7. The method of any one of the preceding embodiments, wherein determining that the first data has the first update rate based on the first timestamp comprises: obtaining a plurality of timestamps associated with updates to the first parent dataset, wherein the plurality of timestamps comprises the first timestamp; determining, from the plurality of timestamps, a subset of timestamps associated with updates to the first data; determining an average update frequency associated with the subset of timestamps; and determining, based on the average update frequency, that the first data has the first update rate.

8. The method of any one of the preceding embodiments, wherein preloading the first data comprises: comparing the first update rate and a threshold update rate; and in response to determining that the threshold update rate is greater than the first update rate, preloading the first data.

9. The method of any one of the preceding embodiments, further comprising: determining a third update rate associated with the second data; determining a difference between the third update rate and the second update rate; based on comparing the difference with a threshold value, determining that the second data has a modified update rate; and based on determining that the second data has the modified update rate, preloading the second data.

10. The method of any one of the preceding embodiments, wherein generating the deployment database comprises: transmitting, using a second application programming interface, a request for metadata artifacts, wherein the request for metadata artifacts comprises the first identifier and a second identifier associated with the second parent dataset; in response to the request for metadata artifacts, receiving a first metadata set for the first parent dataset and a second metadata set for the second parent dataset, wherein the first metadata set corresponds to the first format, and wherein the second metadata set corresponds to the second format; generating a metadata structure comprising the first metadata set and the second metadata set; and generating the deployment database comprising the metadata structure.

11. The method of any one of the preceding embodiments, wherein generating the metadata structure comprises: determining, based on the first metadata set for the first data, a first access control indicator and a first QoS indicator; determining, based on the second metadata set for the second data, a second access control indicator and a second QoS indicator; and providing access to the deployment database based on the first access control indicator, the first QoS indicator, the second access control indicator, and the second QoS indicator.

12. The method of any one of the preceding embodiments, wherein providing access to the deployment database comprises: receiving, from a user device, a user request for access to the deployment database, wherein the user request comprises a user identifier; determining that the user identifier is inconsistent with the first access control indicator; and in response to determining that the user identifier is consistent with the first access control indicator, generating, for display on a user interface associated with the user device, an access denial message.

13. The method of any one of the preceding embodiments, wherein providing access to the deployment database comprises: receiving, from a user device, a user request for access to the deployment database, wherein the user request comprises a user identifier and corresponding user credentials; determining that the user identifier is consistent with the first access control indicator; in response to determining that the user identifier is consistent with the first access control indicator, determining, using the user identifier and the corresponding user credentials, an authorization status for the user request; validating, based on the authorization status, the user device; and based on validating the user device, generating, for display on a user interface associated with the user device, a graphical representation of the deployment database.

14. The method of any one of the preceding embodiments, wherein providing access to the deployment database comprises: receiving, from a user device, a user request for access to the deployment database; comparing the first QoS indicator and the second QoS indicator; based on comparing the first QoS indicator and the second QoS indicator, determining a first data transfer rate associated with the first QoS indicator; and transmitting, at the first data transfer rate, a representation of the deployment database to the user device.

15. The method of any one of the preceding embodiments, wherein providing access to the deployment database comprises: receiving, from a user device, a user request for access to the deployment database; comparing the first QoS indicator and the second QoS indicator; based on comparing the first QoS indicator and the second QoS indicator, determining a second data transfer rate associated with the second QoS indicator; and transmitting, at the second data transfer rate, a representation of the deployment database to the user device.

16. The method of any one of the preceding embodiments, further comprising: detecting a first update to the first parent dataset; and based on detecting the first update to the first parent dataset, storing, within the dependency data structure, an updated preloaded representation of the first parent dataset, wherein the updated preloaded representation comprises the first update to the first parent dataset.

17. The method of any one of the preceding embodiments, wherein storing the first preloaded representation of the first parent dataset comprises: determining a plurality of values of the first parent dataset; and storing, within the dependency data structure, the plurality of values.

18. The method of any one of the preceding embodiments, wherein storing the first preloaded representation of the first parent dataset comprises: determining a plurality of values of the first parent dataset; determining a subset of the plurality of values, wherein each value of the subset corresponds to a portion of the first data of the first format; and storing, within the dependency data structure, the subset of the plurality of values.

19. One or more tangible, non-transitory, computer-readable media storing instructions that, when executed by a data processing apparatus, cause the data processing apparatus to perform operations comprising those of any of embodiments 1-18.

20. A system comprising one or more processors, and memory storing instructions that, when executed by the processors, cause the processors to effectuate operations comprising those of any of embodiments 1-18.

21. A system comprising means for performing any of embodiments 1-18.

What is claimed is:

1. A system, the system for integrating structured data from distinct sources with various update rates for database interoperability, comprising:

one or more processors; and one or more non-transitory, computer-readable media storing instructions that, when executed by the one or more processors, cause operations comprising:

receiving, from a structured database, first tabulated data;

extracting, from the first tabulated data, first column data of a first data format associated with a first parent table and second column data of a second data format associated with a second parent table, wherein the first column data is associated with a first timestamp and the second column data is associated with a second timestamp;

determining that the first column data has a first update rate based on the first timestamp;

determining that the second column data has a second update rate based on the second timestamp;

in response to determining that the first column data has the first update rate, preloading the first column data by:

retrieving, using a first application programming interface, a first table identifier associated with the first parent table, wherein the first table identifier comprises a file path of the first parent table, and storing, within a dependency data structure, a cached representation of the first parent table;

obtaining a first metadata set for the first parent table and a second metadata set for the second parent table, wherein the first metadata set includes, for the first data format, a first access control indicator and a first Quality-of-Service (QOS) indicator, and wherein the second metadata set includes, for the second data format, a second access control indicator and a second QoS indicator; and generating, for deployment to a target system, a deployment database comprising the cached representation retrieved from the dependency data structure, the second parent table, the first metadata set, and the second metadata set, wherein the target system controls access to the deployment database according to the first and second metadata sets.

2. A method for integrating structured data from distinct sources having various update rates, comprising:

receiving, from a first database, first structured data;

extracting, from the first structured data, first data of a first format associated with a first parent dataset and second data of a second format associated with a second parent dataset, wherein the first data comprises a first timestamp, and wherein the second data comprises a second timestamp;

determining that the first data has a first update rate based on the first timestamp;

determining that the second data has a second update rate based on the second timestamp;

in response to determining that the first data has a first upload rate, preloading the first data by:
retrieving, using a first application programming interface, a first identifier associated with the first parent dataset, and
storing, within a dependency data structure, a first preloaded representation of the first parent dataset;

receiving a first request for a deployment database, wherein the first request comprises an indication of the first structured data;

based on the first request, retrieving, from the dependency data structure, the first preloaded representation of the first parent dataset; and generating, for deployment to a target system, the deployment database comprising at least a portion of the first preloaded representation of the first parent dataset, wherein at least the portion of the first preloaded representation comprises the first data.

3. The method of claim 2, wherein preloading the first data comprises:
comparing the first update rate and the second update rate; and
based on determining that the second update rate is greater than the first update rate, preloading the first data.

4. The method of claim 2, further comprising:
comparing the first update rate and the second update rate; and
based on determining that the first update rate is greater than the second update rate, preloading the second data.

5. The method of claim 2, wherein determining that the first data has the first update rate based on the first timestamp comprises:
obtaining a plurality of timestamps associated with updates to the first parent dataset, wherein the plurality of timestamps comprises the first timestamp;
determining, from the plurality of timestamps, a subset of timestamps associated with updates to the first data;
determining an average update frequency associated with the subset of timestamps; and determining, based on the average update frequency, that the first data has the first update rate.

6. The method of claim 2, wherein preloading the first data comprises:
comparing the first update rate and a threshold update rate; and
in response to determining that the threshold update rate is greater than the first update rate, preloading the first data.

7. The method of claim 2, further comprising:
determining a third update rate associated with the second data;
determining a difference between the third update rate and the second update rate;
based on comparing the difference with a threshold value, determining that the second data has a modified update rate; and
based on determining that the second data has the modified update rate, preloading the second data.

8. The method of claim 2, wherein generating the deployment database comprises:
transmitting, using a second application programming interface, a request for metadata artifacts, wherein the request for metadata artifacts comprises the first identifier and a second identifier associated with the second parent dataset;
in response to the request for metadata artifacts, receiving a first metadata set for the first parent dataset and a second metadata set for the second parent dataset, wherein the first metadata set corresponds to the first format, and wherein the second metadata set corresponds to the second format;
generating a metadata structure comprising the first metadata set and the second metadata set; and
generating the deployment database comprising the metadata structure.

9. The method of claim 2, further comprising:
detecting a first update to the first parent dataset; and
based on detecting the first update to the first parent dataset, storing, within the dependency data structure, an updated preloaded representation of the first parent dataset, wherein the updated preloaded representation comprises the first update to the first parent dataset.

10. The method of claim 2, wherein storing the first preloaded representation of the first parent dataset comprises:
determining a plurality of values of the first parent dataset; and
storing, within the dependency data structure, the plurality of values.

11. The method of claim 2, wherein storing the first preloaded representation of the first parent dataset comprises:
determining a plurality of values of the first parent dataset;
determining a subset of the plurality of values, wherein each value of the subset corresponds to a portion of the first data of the first format; and
storing, within the dependency data structure, the subset of the plurality of values.

12. The method of claim 4, further comprising:
preloading the second data by:
retrieving, using the first application programming interface, a second identifier associated with the second parent dataset, and storing, within the dependency data structure, a second preloaded representation of the second parent dataset; and generating the deployment database comprising at least a portion of the second preloaded representation of the second parent dataset, wherein at least the portion of the second preloaded representation comprises the second data.

13. The method of claim 8, wherein generating the metadata structure comprises:

determining, based on the first metadata set for the first data, a first access control indicator and a first QoS indicator;

determining, based on the second metadata set for the second data, a second access control indicator and a second QoS indicator; and providing access to the deployment database based on the first access control indicator, the first QoS indicator, the second access control indicator, and the second QoS indicator.

14. The method of claim 13, wherein providing access to the deployment database comprises:

receiving, from a user device, a user request for access to the deployment database, wherein the user request comprises a user identifier;

determining that the user identifier is inconsistent with the first access control indicator; and in response to determining that the user identifier is consistent with the first access control indicator, generating, for display on a user interface associated with the user device, an access denial message.

15. The method of claim 13, wherein providing access to the deployment database comprises:

receiving, from a user device, a user request for access to the deployment database, wherein the user request comprises a user identifier and corresponding user credentials;

determining that the user identifier is consistent with the first access control indicator;

in response to determining that the user identifier is consistent with the first access control indicator, determining, using the user identifier and the corresponding user credentials, an authorization status for the user request;

validating, based on the authorization status, the user device; and based on validating the user device, generating, for display on a user interface associated with the user device, a graphical representation of the deployment database.

16. The method of claim 13, wherein providing access to the deployment database comprises:

receiving, from a user device, a user request for access to the deployment database;

comparing the first QoS indicator and the second QoS indicator;

based on comparing the first QoS indicator and the second QoS indicator, determining a first data transfer rate associated with the first QoS indicator; and transmitting, at the first data transfer rate, a representation of the deployment database to the user device.

17. The method of claim 13, wherein providing access to the deployment database comprises:

receiving, from a user device, a user request for access to the deployment database;

comparing the first QoS indicator and the second QoS indicator;

based on comparing the first QoS indicator and the second QoS indicator, determining a second data transfer rate associated with the second QoS indicator; and transmitting, at the second data transfer rate, a representation of the deployment database to the user device.

18. One or more non-transitory, computer-readable media storing instructions that, when executed by one or more processors, cause operations comprising:

receiving, from a first database, first structured data;

extracting, from the first structured data, first data of a first format associated with a first parent dataset and second data of a second format associated with a second parent dataset, wherein the first data comprises a first timestamp, and wherein the second data comprises a second timestamp;

determining that the first data has a first update rate based on the first timestamp;

determining that the second data has a second update rate based on the second timestamp;

in response to determining that the first data has a first upload rate, preloading the first data by:

retrieving, using a first application programming interface, a first identifier associated with the first parent dataset, and storing, within a dependency data structure, a first preloaded representation of the first parent dataset;

retrieving, from the dependency data structure, the first preloaded representation of the first parent dataset; and generating, for deployment to a target system, a deployment database comprising at least a portion of the first preloaded representation of the first parent dataset, wherein at least the portion of the first preloaded representation comprises the first data.

19. The one or more non-transitory, computer-readable media of claim 18, further comprising:

comparing the first update rate and the second update rate; and based on determining that the first update rate is greater than the second update rate, preloading the second data.

20. The one or more non-transitory, computer-readable media of claim 19, further comprising:

preloading the second data by:

retrieving, using the first application programming interface, a second identifier associated with the second parent dataset, and storing, within the dependency data structure, a second preloaded representation of the second parent dataset; and generating the deployment database comprising at least a portion of the second preloaded representation of the second parent dataset, wherein at least the portion of the second preloaded representation comprises the second data.

* * * * *